(12) United States Patent
Spurrier

(10) Patent No.: US 11,835,797 B2
(45) Date of Patent: Dec. 5, 2023

(54) EYEWEAR WITH WATER PROOF PARTS AND ANTI-FOG LENSES

(71) Applicant: Donna Dipboye Spurrier, Glen Allen, VA (US)

(72) Inventor: Donna Dipboye Spurrier, Glen Allen, VA (US)

(73) Assignee: Donna Dipboye Spurrier, Glen Allen, VA (US)

( * ) Notice: Subject to any disclaimer, the term of this patent is extended or adjusted under 35 U.S.C. 154(b) by 566 days.

(21) Appl. No.: 16/532,643

(22) Filed: Aug. 6, 2019

(65) Prior Publication Data

US 2020/0041814 A1 Feb. 6, 2020

Related U.S. Application Data

(60) Provisional application No. 62/714,801, filed on Aug. 6, 2018.

(51) Int. Cl.
| | | |
|---|---|---|
| *G02C 3/04* | (2006.01) | |
| *G02C 5/00* | (2006.01) | |
| *F16M 13/02* | (2006.01) | |
| *G02C 11/08* | (2006.01) | |

(52) U.S. Cl.
CPC ............. *G02C 3/04* (2013.01); *G02C 5/001* (2013.01); *G02C 5/008* (2013.01); *F16M 13/02* (2013.01); *G02C 11/08* (2013.01)

(58) Field of Classification Search
CPC .......... G02C 5/001; G02C 3/04; G02C 5/008; G02C 11/08; F16M 13/02

USPC .......................................... 351/158; 211/85.1
See application file for complete search history.

(56) References Cited

U.S. PATENT DOCUMENTS

| | | | | | |
|---|---|---|---|---|---|
| 407,789 | A | * | 7/1889 | Nolte ........................ | G02C 5/12 351/71 |
| 527,147 | A | * | 10/1894 | Green ..................... | G02C 5/001 351/66 |
| 1,024,275 | A | * | 4/1912 | Morton ................... | G02C 5/143 351/111 |
| 1,094,275 | A | * | 4/1914 | Morton ................... | G06C 23/04 235/81 A |
| 1,779,015 | A | * | 10/1930 | Schmitt ..................... | G02C 3/04 351/112 |
| D253,599 | S | * | 12/1979 | Bell, Jr. ....................... | D16/335 |
| 5,340,074 | A | * | 8/1994 | Porcaro ............. | B65D 73/0071 248/340 |
| 5,592,244 | A | * | 1/1997 | Vyhmeister ............. | B60R 7/082 351/158 |
| 6,033,068 | A | * | 3/2000 | Spilkin ................... | G02C 5/006 351/158 |
| 6,287,683 | B1 | * | 9/2001 | Itoh .......................... | G02B 1/10 428/428 |

(Continued)

*Primary Examiner* — George G. King
(74) *Attorney, Agent, or Firm* — Foley & Lardner LLP

(57) ABSTRACT

Eyewear is provided for use in wet settings, the eyewear including an eyeglass frame, a pair of arms, and a pair of lenses. The frame is connected to the arms, one each on opposite ends of the frame, by a hinge, and the frame, arms and hinges are formed of non-rusting materials. The lenses are made of plastic and are set in the frame, and wherein the lenses are coated with an anti-fog coating. The frame may further define a ring adapted to be hung onto a hanger. Alternatively, one of the arms further defines a ring adapted to be hung onto a hanger.

13 Claims, 10 Drawing Sheets

(56) References Cited

U.S. PATENT DOCUMENTS

| | | | | |
|---|---|---|---|---|
| 2009/0053465 A1* | 2/2009 | Scherg | .................... | G02B 1/18 |
| | | | | 428/137 |
| 2010/0110366 A1* | 5/2010 | Shapiro | ................. | G02C 5/143 |
| | | | | 351/112 |
| 2011/0119871 A1* | 5/2011 | Chauvin | ................ | G02C 11/00 |
| | | | | 24/304 |
| 2012/0017479 A1* | 1/2012 | Kolton | ................. | G09F 3/0297 |
| | | | | 235/494 |
| 2012/0154737 A1* | 6/2012 | Daole | .................... | G02C 11/02 |
| | | | | 351/63 |
| 2015/0378172 A1* | 12/2015 | Tenuta | ................... | G02C 5/146 |
| | | | | 351/112 |
| 2017/0242267 A1* | 8/2017 | Barnett | ................. | G02C 5/006 |

\* cited by examiner

EYEWEAR WITH WATER PROOF PARTS AND ANTI-FOG LENSES

This application claims the benefit of U.S. Provisional Application No. 62/714,801, filed Aug. 6, 2018, which is incorporated herein by reference in its entirety.

The present invention relates to corrective eyewear, and specifically it relates to eyewear for use in shower, bath and spa settings where it is subject to moisture and otherwise subject to wear and corrosion.

BACKGROUND

It is widely recognized that a large portion of the population requires some form of corrective lenses for clear vision. Over 61% of the population, or 177 million people in the United States, need some sort of vision correction according to Jobson Research (2005). Sixty-one percent need eyewear due to myopia (near-sightedness) and thirty-one percent need vision correction due to age-related presbyopia (far-sightedness). As people age, the cornea of the eye may harden over time preventing a person from seeing far or short distances. Some people may only wear corrective lenses for a small part of a day, some people rely on their corrective lenses for almost everything that they do.

It is also recognized that some calculations 75% of eyeglass purchases are for frames costing $150 or less. The use of generally low-cost glasses with no specific prescription, but simply a standard magnification strength, more commonly known as "readers", are fairly inexpensive to produce and used widely by the elderly community and traditional bifocal users. According to the Vision Impact Institute, most people will develop presbyopia in their early to mid-40s and the number of people who wear corrective lenses spikes in the 40s. Reading glasses can offer magnification between +1.00 and +4.0 and can conveniently be purchased without a prescription. Furthermore, most brands today have designs that come in a variety of shapes, styles, and colors to appeal to everyone.

One place where corrective lenses are almost never used is in a shower or spa setting where there is much water and moisture. The glasses easily fog in a hot shower. However, it is very challenging for some people to shower or bathe or enjoy a spa and still see what they are doing. Traditional eyewear has metal components that are subject to rust and corrosion, so they are not favored for use in these humid and wet settings.

SUMMARY

Accordingly, it is an object of the present invention to provide corrective eyewear that is specially adapted to be useful in a wet setting such as a shower, bath or spa. The eyewear will have a waterproof frame and plastic lenses that are coated with an anti-fogging agent so that a user will be able to see clearly even in a shower or other wet setting.

In one example, eyewear is provided for use in wet settings, the eyewear comprising an eyeglass frame, a pair of arms, and a pair of lenses. The frame is connected to the arms, one each on opposite ends of the frame, by a hinge, and the frame, arms and hinges are formed of non-rusting materials. The lenses are made of plastic and are set in the frame, and wherein the lenses are coated with an anti-fog coating. The frame may further define a ring adapted to be hung onto a hanger. Alternatively, one of the arms further defines a ring adapted to be hung onto a hanger. The ring may be an open-ended hook. The ring may be a loop. The ring may be attached onto an arm. The lenses may be formed of a polycarbonate material. The lenses may have a corrective magnification of −4 to +4, or alternatively, −2 to +2. The frame may be made of plastic, or cellulose acetate, or nylon. The frame may be made of a non-rust metal, in one example, aluminum.

DETAILED DESCRIPTION

Figure 1:
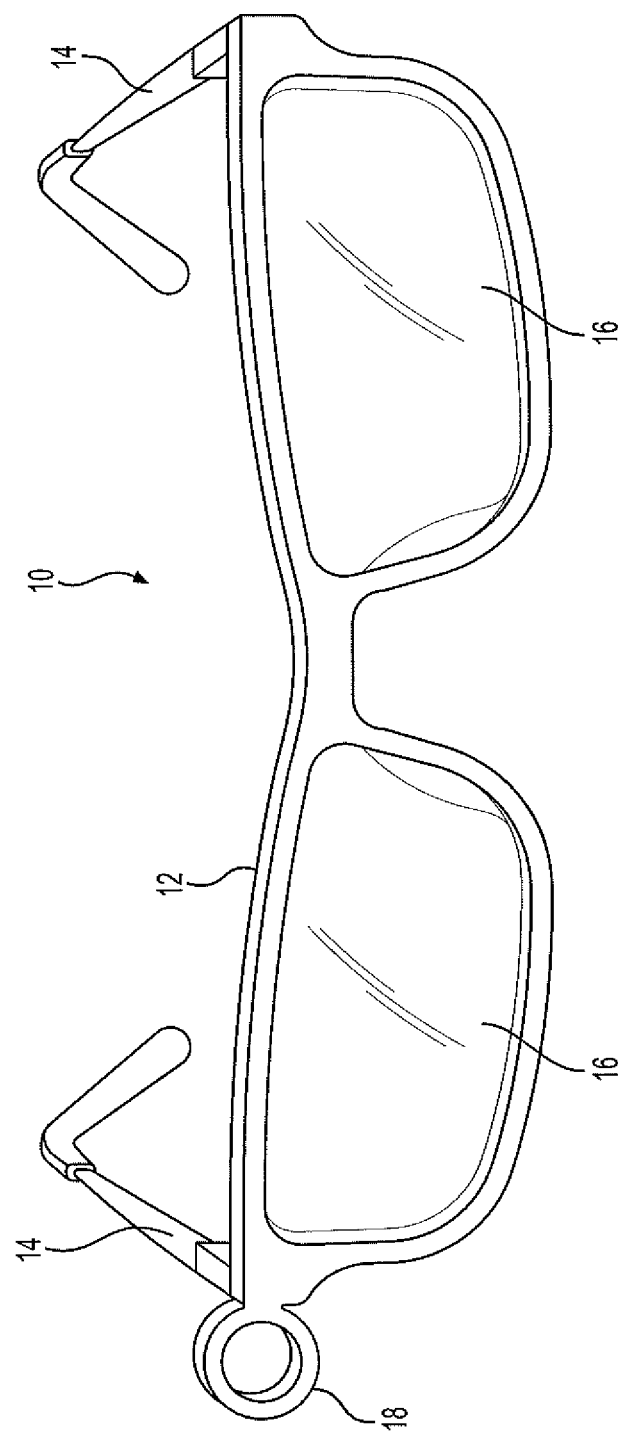
FIG. 1 is a front perspective view of a pair of glasses as described herein.

The present invention generally relates to eyeglasses for use in a shower, bathtub, or bathroom. It is a goal of the present invention for the user, who is in need of a certain magnified strength of lenses or corrective lenses to complete daily tasks while bathing, to successfully read bath product labels and directions, and groom by means of shaving or trimming.

The glasses include several parts which previously have not been put together in eyewear for individuals needing to wear glasses while bathing or showering. The glasses include a pair of plastic lenses with a predetermined magnification strength appropriate for an individual user. The glasses lenses will have an anti-fog coating, and optionally a scratch proof coating and water-resistant coating on the plastic lenses to reduce or prevent the build-up of water in the form of steam and water droplets, which is a consequence of showering. The present glasses may also include frames and regular hinges or optionally spring hinges wherein the hinges can be moved past a 90 degree angle. The hinges may also optionally be covered in a durable, waterproof plastic which reduces or eliminates the possibility of rust on the hardware of the glasses. The present invention also optionally includes a circular or u-shaped ring on the right or left side of the frame as an extension of the frame wherein the user can hang the eyewear by the ring onto a hook that has been attached to a suction cup or adhesive and fastened on a bathroom wall or shower tile for convenience.

The glasses frame is typically a frame with two openings for the lenses to fit securely into. The geometric shape of the frames is limited only by the fashion imagination. Generally speaking, the frames will have a roundish, rectangular or oval shape or also for instance the more stylish "cat-eye" shape. Most commonly, the frames will completely encircle the lenses to be mounted therein, because this is likely to be the most durable construction in this setting where the glasses may be inadvertently dropped or otherwise subject to rough duty. However, it is possible that the glasses described herein may be semi-circular and encircle only about half of the respective lenses. It is even possible for the glasses to be what is referred to as rimless where the lenses are only attached to or set in the arms on each side and to the nose bridge between the lenses. These semi rimless and rimless alternatives would require durable connections to stand up to the expected rough duty in a shower or bathroom or spa setting.

For the frame of the glasses, a plastic product is believed to be the best material for this component. This eyewear needs to be durable, lightweight, safe for use during physical activities, and water resistant. Cellulose acetate, also known in one commercial embodiment as zylonite, is one of the most common found materials from which plastic frames are manufactured. It is a durable plastic and has a wide range of transparency and colors available. Nylon is another plastic that started being used in eyewear in the 1980s and can be comprised of gliamides, grilamid, and trogamid materials. Nylon is resistant to heat and cold, and is quite flexible. Sports eyewear are most commonly made with this plastic. Proprionate is a nylon-based plastic that performs along the same lines as nylon. It is durable, lightweight, and hypoallergenic. Another plastic that is used generally in children's eyewear is silicone. It has to the potential to be BPA free, rubber free, latex free, and is hypoallergenic. An entire frame made of silicone would allow for great flexibility and eliminate the need for hinges, although this would be challenging to engineer a solely silicone frame that successfully stayed on a person's head. Silicone is also waterproof and very durable. Still further alternatively, the frames may be formed of a non-rusting metal, for example, aluminum or stainless steel.

The eyewear described herein also include a ring. The ring may be attached to or an integral part of the glasses frame. Alternatively, and possibly additionally, a ring may be attached to or an integral part of one or both of the arms of the glasses. The ring may be a circular, oval, rectangular or other annular shape that is open in the middle and therefore adapted to be placed over a hanger. For the purposes of this application, the ring may also be open in a hook shape so that it might alternatively be able to hook over a hanger. If in the shape of a hook, then the ring should be rounded or otherwise designed to remove any sharp points.

The hanger is adapted to be mounted, removably or permanently, onto a convenient surface where the glasses can be stored. For instance, the hanger may be a hook on a suction cup that can be removably mounted on a shower or bath tile. The hanger may be adhered to or otherwise fixed by a fastener to a wall or convenient surface. This may include being mounted in or adjacent a shower/bath location. Alternatively, the hanger may be mounted in a locker room or dressing room in a spa for use by patrons. The hanger may be a hook shape adapted to hook into the annular ring on the glasses. The hanger may be a rod that is inserted into a glasses ring. The hanger can be a loop adapted to receive the embodiment of the hook-shaped ring.

The glasses hinges are positioned between and connect the frame to the arms of the glasses. The hinges are adapted to be unaffected by a moist or wet environment. For this reason, if metal, they are formed of a non-rust material such as, but not limited to, stainless steel and aluminum. The hinges may be plastic and metal. The hinges may be live hinges where the frame is molded with the arms and are formed of a flexible, resilient material. The live hinges may be either metal or plastic. The hinges may be spring hinges to help facilitate the rotation beyond 90 degrees of the arms.

The eyewear described herein are especially adapted for use in moist or wet settings. When producing eyewear for use in the shower, durability and safety are two of the main concerns during development. Another feature that must be adapted are the lenses. Plastic would be the only suitable material for this type of eyewear as the user would be using the eye glasses in the bathroom and shower. The lenses have to be resistant to breaking, scratch proof, and be impervious to condensation and fog. If a lens is not made of glass, it will most commonly be made of a polycarbonate plastic. This lens is standard for safety glasses, sports goggles, and children's eyewear. It is less likely to fracture than regular plastic lenses. Another durable plastic that is known is Trivex® lenses, manufactured by PPG Industries. It is thin, lightweight, impact resistant, and composed of a urethane-based monomer. The production of Trivex® lenses is different from polycarbonate and other plastic lenses in that is it cast molded as opposed to injection molded which can provide crisper optics.

The glasses herein are recommended for a wide range of corrective prescriptions from magnifications of +/−2 to +/−4. Also, for users including but not limited to children, who may have additional visual corrective needs such as astigmatism, the lenses may be engineered to fix those vision problems.

Another optional feature of this eyewear is the coatings and treatments that can be applied to the lenses to make this product better usable while showering or in a bathroom where steam and humidity are definite factors. First, the lenses should have an abrasion resistant coating on them which almost all current eyewear has. It can prolong the life of the lens and provide clearer vision. To make the lenses water resistant, surfactant coatings may be used. One coating is called FogFree® defogger and can be thermally applied to the lens after it is cut. Made by Opticote, this product eliminates the condensation of moisture on the lens, eliminates steam, and would provide the user with clear vision while, for example, reading labels of hygiene products in the shower or shaving. Another problem a user could encounter would be the formation of water droplets on the lenses. For this, a hydrophobic silicone polymer coating could be applied to the lenses that forces water to bead and roll off the surface. Such products currently exist that are used for automotive purposes. Rain-X® water repellent, for example, is a windshield product that contains ethanol, isopropanol, a surfactant such as PDMS (polydimethylsiloxanes), and silicones which trap water molecules, forms a barrier around them, and dries, allowing the water to form beads which falls off of the substrate. It could be proposed that the same concept and technology can be used for eyewear. Hydrophilic coatings may also optionally be used.

It is also envisioned that the glasses may be sold as a kit, One or more of the glasses with a ring on the frame or arm may be sold together with a hanger. The kit may be sold with whatever form of hanger is paired with the type of ring on the glasses—for instance a hook or a loop. The kit may include multiple hangers so that the glasses may be hung in multiple locations such as indoor and outdoor showers or at a home and vacation home. Multiple glasses may be sold as a kit with multiple hangers. In each case, the glasses and hangers are engineered to match so that the glasses are available for use by a user in a shower or spa setting.

Turning now to the drawings, FIG. 1 shows a pair of glasses 10 that include the frame 12 and a pair of arms 14 hingedly connected to the frame at the sides of the frame. The frame 12 has lenses 16 mounted therein. Facing the glasses 10, on the left side of the frame 12 there is a circular loop 18 extending outwardly from the frame. The lenses 16 are made of plastic and have a transparent anti-fog coating applied to them. In this example, the frame 12 completely encircles each of the lenses 16. Alternatively, the frame 12 might encircle only a portion of the perimeter of the lenses 16. Also, the hinges that connect the frame 12 to the arms 14 are formed of non-rusting materials as described earlier herein.

Figure 2:
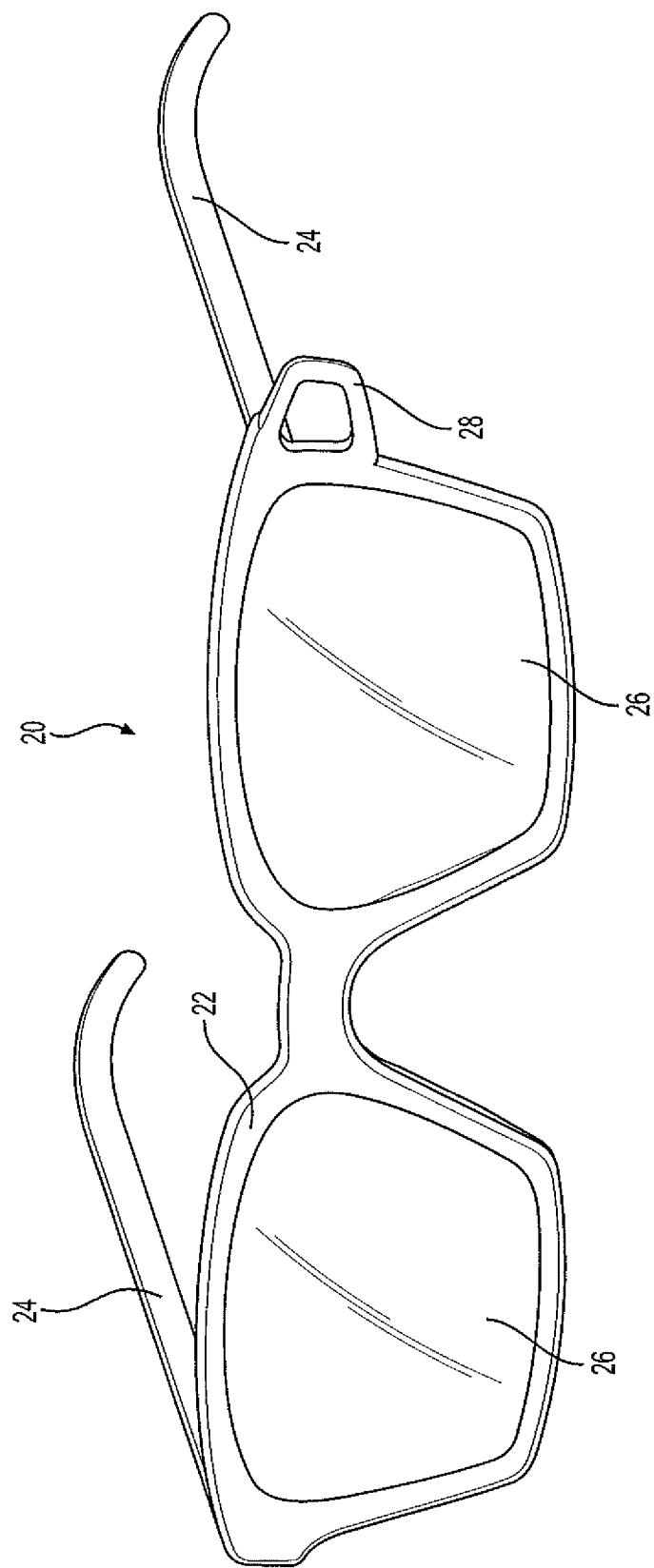
FIG. 2 is a perspective view of a second pair of glasses as described herein.

FIG. 2 is very similar to FIG. 1 except in the shape of its glasses and the location of the loop on the frame. FIG. 2 shows a pair of glasses 20 that include a frame 22 hingedly connected to arms 24. The hinges that attach the frame 22 to the arms 24 are formed on a non-rust material. The frame 22 encircles and holds lenses 26 securely in the frame. The lenses 26 are made of plastic and are coated with an anti-fog coating. On the right side of the frame 22 is a D-shaped loop 28 extending outwardly from the frame.

Figure 3:
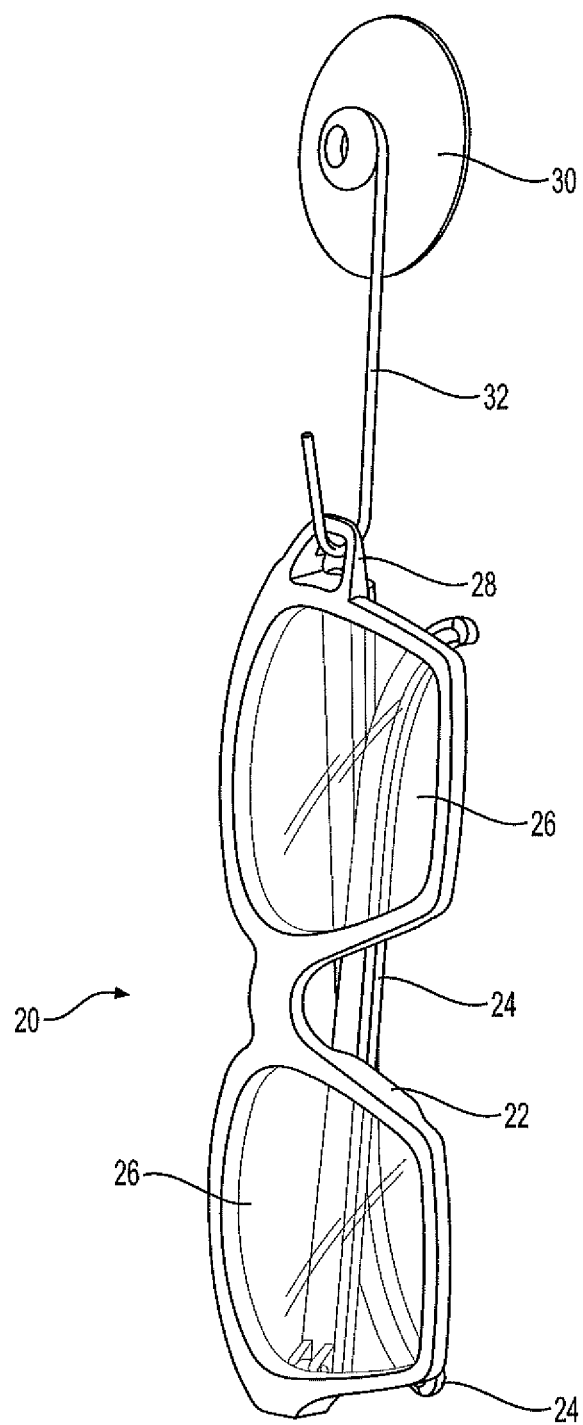
FIG. 3 is a perspective view of the glasses from FIG. 2 in a closed position and hanging from a hook on a wall.

FIG. 3 shows the glasses 20 from FIG. 2 hanging on a hook 32 that is attached to a suction cup 30 that is releasably fixed to a wall or other vertical and smooth surface. In this FIG. 3, the glasses 20 are shown in the folded position with the arms 24 hingedly rotated closed so that the glasses 20 can hang generally flat against the wall. In common practice, it is expected that the suction cup 30 will be secured to a shower wall or tile so that the glasses 20 are available to a user in the shower.

Figure 4A:
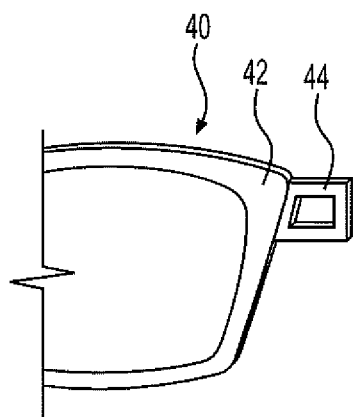
FIGS. 4A-D are alternative views of a side of a pair of glasses having a different-shaped ring on the corner of those frames.
Figure 4B:
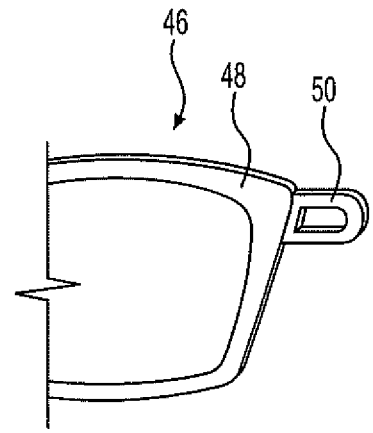
Figure 4C:
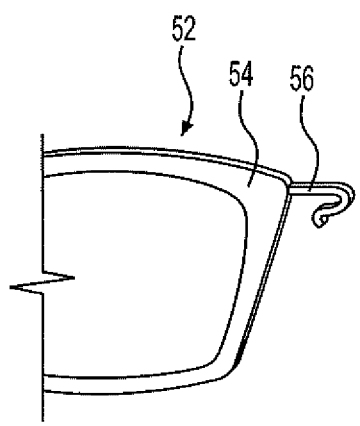
Figure 4D:
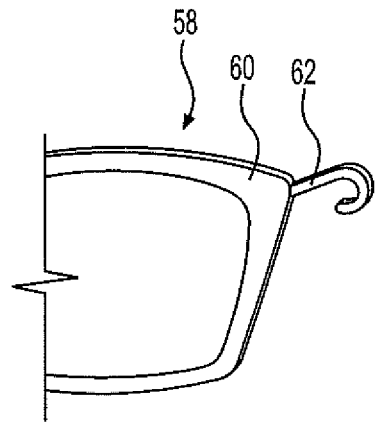

FIGS. 4A-D illustrate that the loop component of the glasses described herein may come in different shapes and forms. FIG. 4A illustrates a pair of glasses 40 with a frame 42 and a square-shaped loop 44 extending outwardly from the frame. FIG. 4B illustrates a pair of glasses 46 with a frame 48 and a D-shaped loop 50 extending outwardly from the frame. FIG. 4C illustrates a pair of glasses 52 with a frame 54 and a hook loop 56 extending outwardly therefrom. And FIG. 4D illustrates a pair of glasses 58 with a frame 60 and a different-shaped hook 62 extending outwardly therefrom. These figures are only examples of the many shapes and configurations that a loop, whether a closed loop or an open hook loop according to the glasses describes herein may be shaped. Importantly, the open hook has an opening in it to allow it to be able to hook over a hook of ring easily.

Figure 5A:
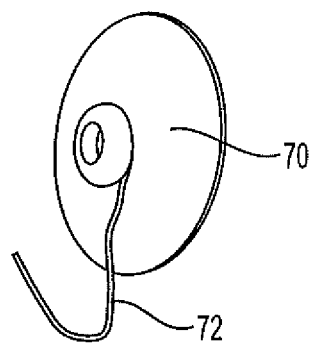
FIGS. 5A-C are three different examples of a hook as described herein.
Figure 5B:
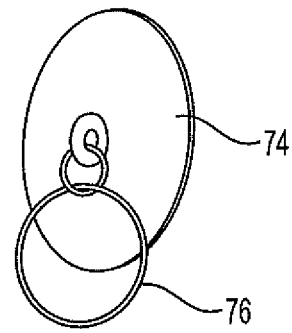
Figure 5C:
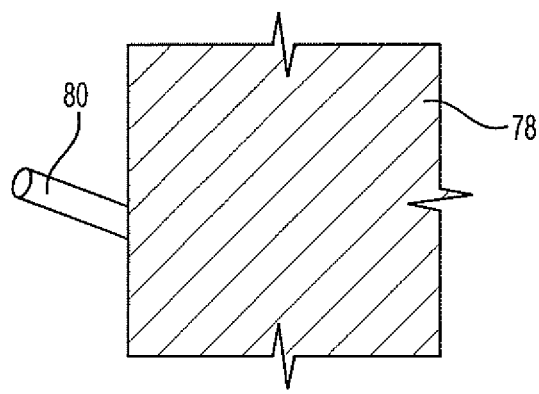

FIGS. 5A-C illustrate examples of the hanger described herein. In FIG. 5A, the hanger is a suction cup 70 with a hook 72 attached to and extending downwardly from the suction cup. Most any loop on a pair of glasses may be hung from the suction cup 70 and hook 72. In FIG. 5B, there is a suction cup 74 with a ring 76 attached to the suction cup. In this example, an open hook loop as shown for example in FIGS. 4C and 4D may be hung into the ring 76. FIG. 5C illustrates a peg or dowel 80 fixed in a wall 78. A pair of glasses with a look may be hung on the dowel 80.

Figure 6:
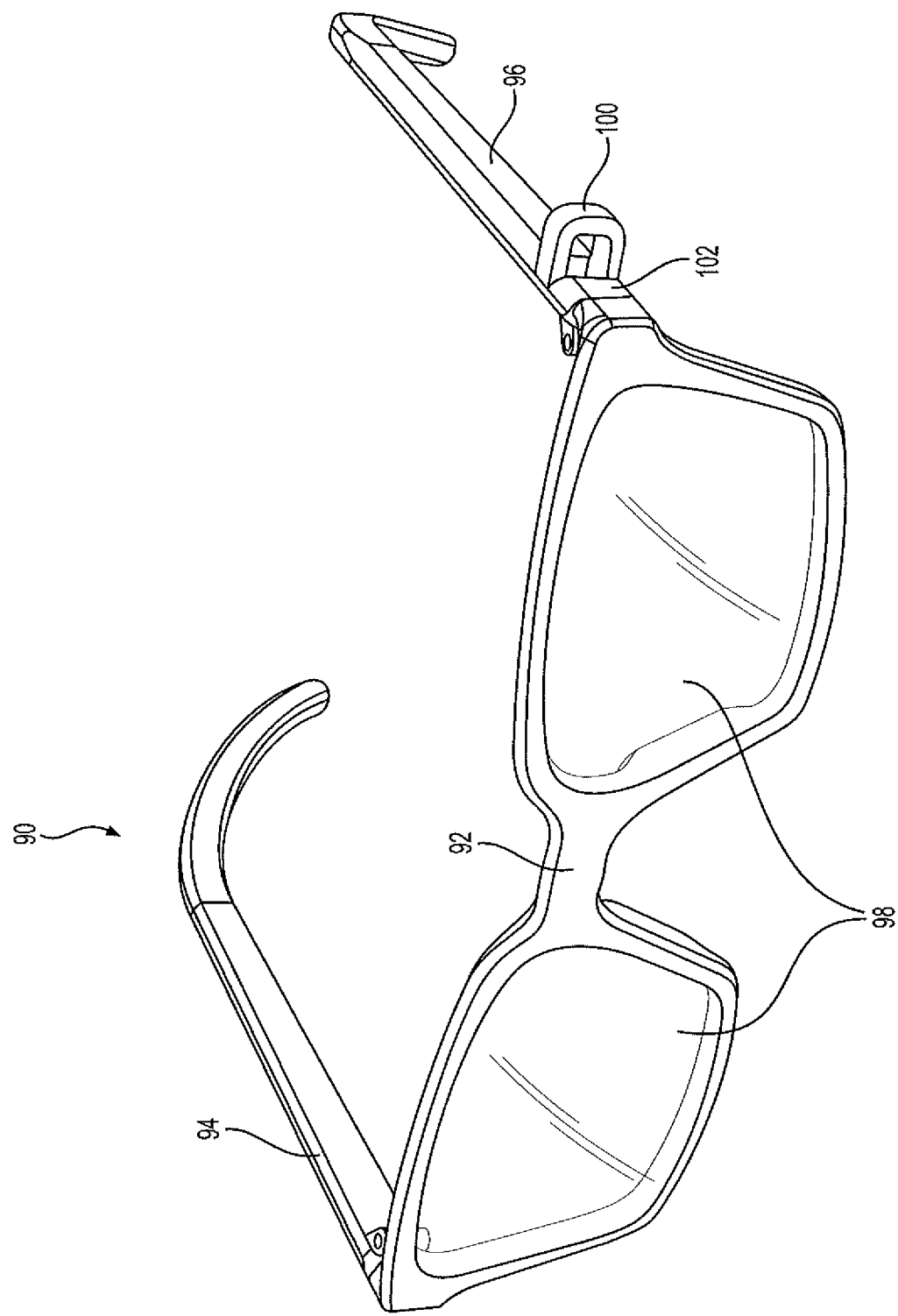
FIG. 6 is a perspective view of a pair of glasses with a loop on an arm of the glasses.
Figure 7:
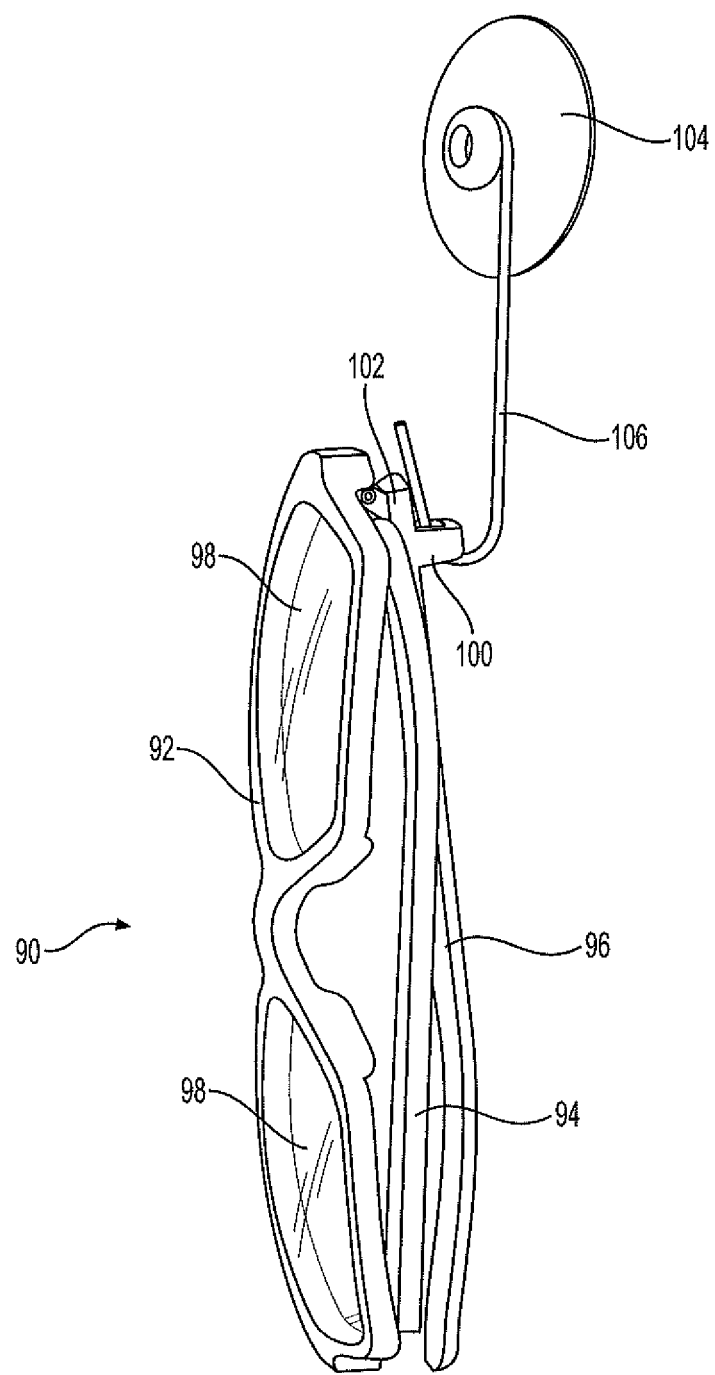
FIG. 7 is a perspective view of the glasses shown in FIG. 6 in the folded position and hanging from a hook mounted on a wall.

FIG. 6 illustrates a pair of glasses 90 with a loop 100 extending outwardly from arm 96 that is hingedly connected to the frame 92. The glasses 90 also include lenses 98 mounted in the frame 92 and a second arm 94 also hingedly connected to the frame. The loop 100 is positioned close to the proximate end 102 of the arm 96 near the frame 92. FIG. 7 is another view of the glasses 90 from FIG. 6. The arms 94 and 96 are folded up to the frame 92. This allows the loop 100 to easily receive the hook 106 into it. As noted, the loop 100 is at or near the proximal end 102 of the arm next to the frame 92.

Figure 8:
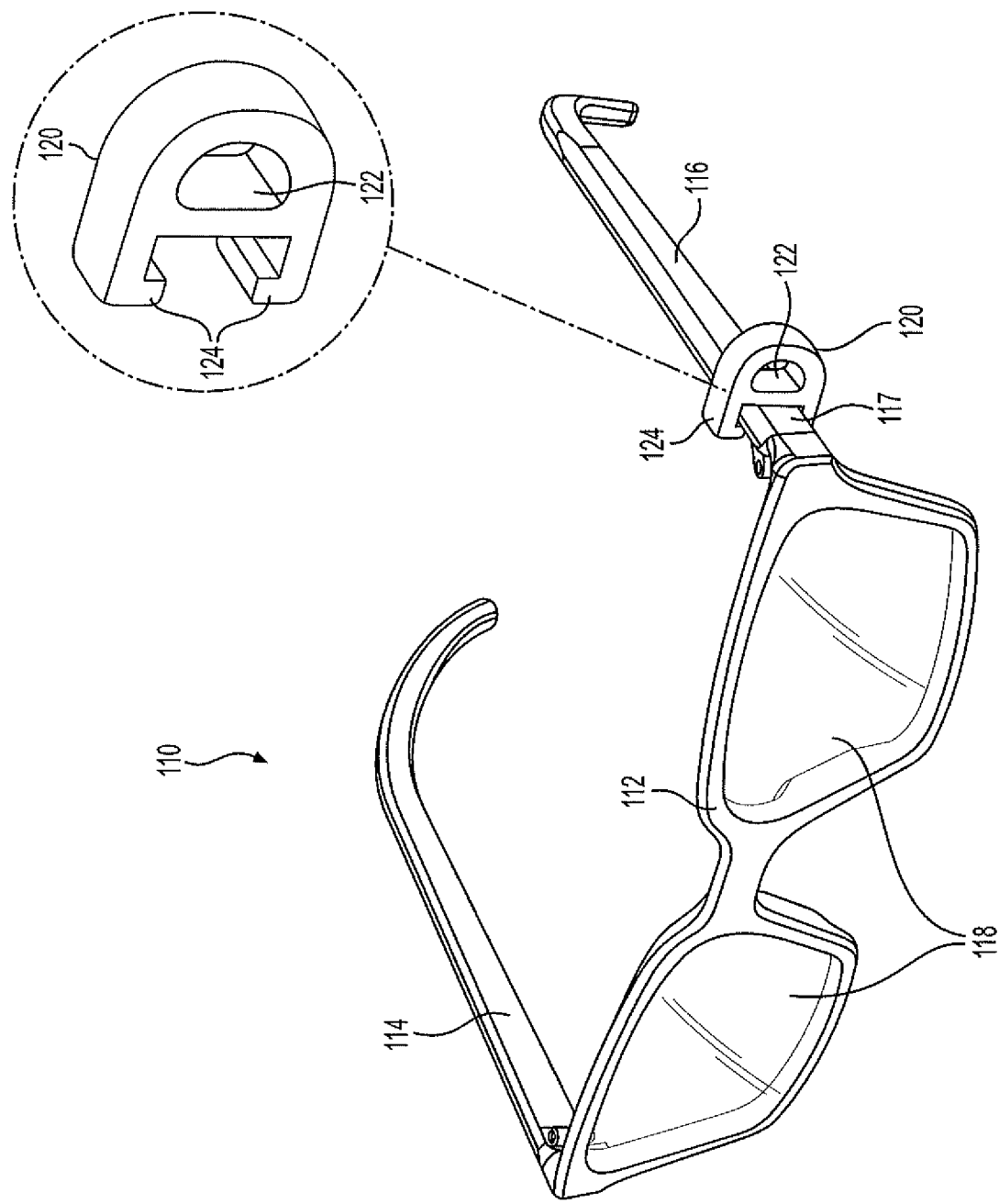
FIG. 8 is a perspective view of a pair of glasses with a loop clamped onto one of its arms together with a close-up of the loop clamp.

FIG. 8 is generally similar to FIG. 6 in that a loop 120 is positioned on an arm 116 on a pair of glasses 110. The glasses 110 include a frame 112, arms 114 and 116 and lenses 118 mounted in the frame. The loop 120 forms the aperture 122 and a clamp 124 that connects the loop 120 to the proximal end 117 of arm 116. The clamp 124 may be positioned on either arm 114 or 116, but here is shown on arm 116. These glasses 110 would hang from a hook similar to that shown in FIG. 7.

Figure 9:
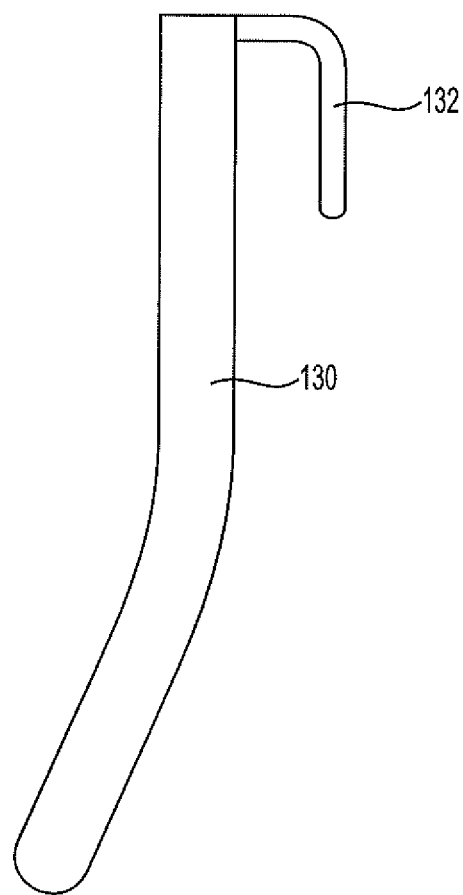
FIG. 9 is a side view of a glasses arm alone with a hook on its side.

The loops 100 and 120 in FIGS. 6 and 8 respectively illustrate closed loops to be hung from a hook hanger. In FIG. 9, there is shown a glasses arm 130 only that has an open hook 132 positioned at what would be the proximal end of the arm when hingedly connected to a glasses frame. As noted earlier, the hook 132 is an open hook in that there is an opening to freely be placed over a ring or other hook.

Figure 10:
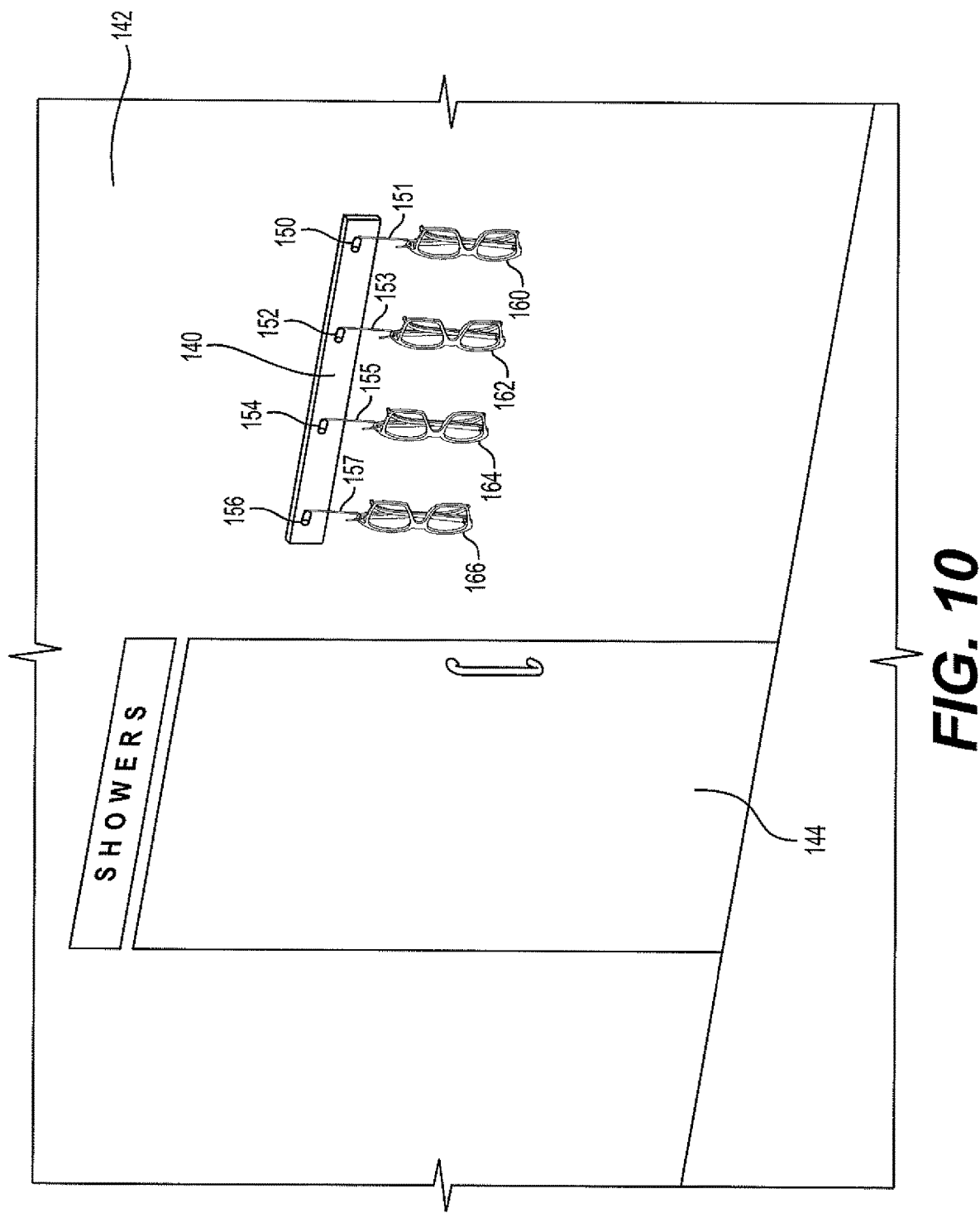
FIG. 10 is a perspective environmental view of a rack of glasses as described herein and with different magnifications as mounted outside of a shower room.

Finally, FIG. 10 illustrates one way that the glasses described herein may be used. Whether it is a family setting or spa setting, a rack 140 is mounted on a wall 142 next to a shower door 144. The rack has four pegs 150, 152, 154 and 156 with hooks 151, 153, 155, and 157 hanging from them respectively. Four pair of glasses 160, 162, 164, and 166 are hanging from the rack 140. In a four-person family, this might mean a specific pair of glasses for each person to use in the shower. At a spa, the glasses could be different magnifications so that any user of the shower could select the glasses that are best for their eyes to use. The glasses could be color-coded by size, or there could be size indicia on the glasses themselves or on the rack.

Other embodiments of the present invention will be apparent to those skilled in the art from consideration of the specification. It is intended that the specification and figures be considered as exemplary only, with a true scope and spirit of the invention being indicated by the claims.

That which is claimed is:

1. An eyewear kit for use in wet settings, the kit comprising:
   eyewear and a hanger,
   the eyewear comprising an eyeglass frame, a pair of arms, and a pair of corrective lenses;
   wherein the frame is connected to the arms, one each on opposite ends of the frame, by a hinge, and the frame, arms and hinges are formed of non-rusting materials; and
   the lenses are formed of a polycarbonate material and are set in the frame, and wherein the lenses are treated with one of a hydrophobic and hydrophilic coating;
   wherein the frame or at least one of the arms further defines a first ring; and
   the hanger comprises a second ring and a suction cup which is adapted to be secured to a flat surface, and wherein the first ring is adapted to be hung onto the second ring.

2. The eyewear kit as described in claim 1, wherein the first ring is an open-ended hook.

3. The eyewear kit as described in claim 2, wherein the second ring is a loop.

4. The eyewear kit as described in claim 1, wherein the first ring is a loop.

5. The eyewear kit as described in claim 4, wherein the second ring is an open-ended hook.

6. The eyewear kit as described in claim 1, wherein the first ring is attached to one of the arms.

7. The eyewear kit as described in claim 1, wherein the lenses have a corrective magnification of −4 to +4.

8. The eyewear kit as described in claim 1, wherein the lenses have a corrective magnification of −2 to +2.

9. The eyewear kit as described in claim 1, wherein the frame is made of plastic.

10. The eyewear kit as described in claim 1, wherein the frame is made of cellulose acetate.

11. The eyewear kit as described in claim 1, wherein the frame is made of nylon.

12. The eyewear kit as described in claim 1, wherein the frame is made of a non-rust metal.

13. The eyewear kit as described in claim 1, wherein the frame is made of aluminum.

\* \* \* \* \*